Nov. 12, 1946.  J. A. GUYER  2,410,970
OIL DESALTING AND/OR DEWATERING
Filed Jan. 5, 1945
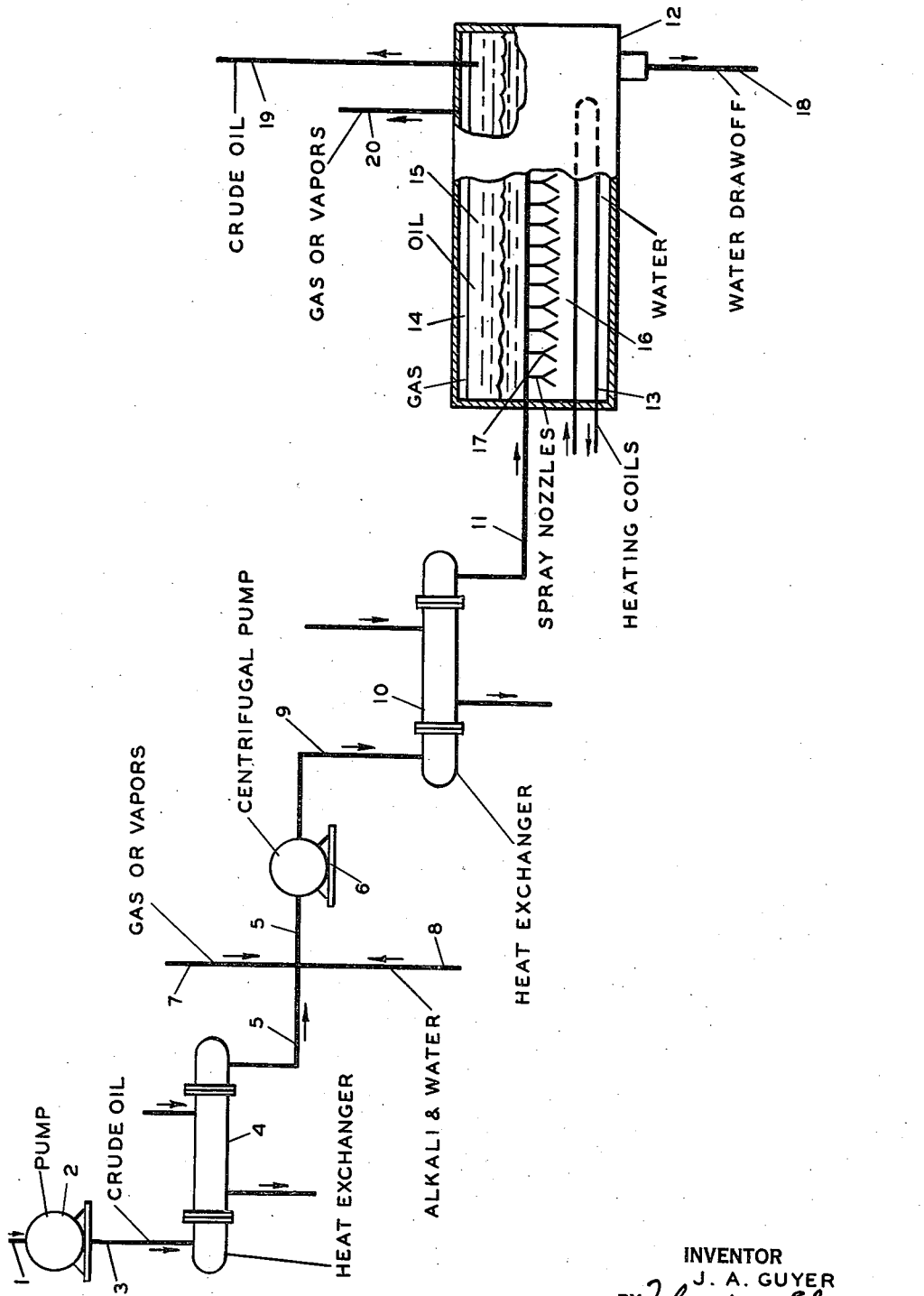
INVENTOR
J. A. GUYER
BY Hudson & Young
ATTORNEYS Patented Nov. 12, 1946

2,410,970

UNITED STATES PATENT OFFICE 2,410,970

OIL DESALTING AND/OR DEWATERING

Jesse A. Guyer, Bartlesville, Okla., assignor to Phillips Petroleum Company, a corporation of Delaware Application January 5, 1945, Serial No. 571,525

19 Claims. (Cl. 252—330)

This invention relates to oil desalting and/or dewatering. In one of its most specific aspects it relates to removing the connate salt in crude oil. In another of its most specific aspects it relates to removing water from crude oil.

Crude oil as it comes out of the well often contains microscopic crystals of connate salt and small particles of water. In order to utilize this crude oil to obtain hydrocarbons such as gas therefrom, it is necessary to separate out the salt and water that the oil may contain. This is often complicated because the water may form an emulsion and the salt is not easy to separate.

A number of methods have been proposed to remove the salt and water but none of these methods are as efficient as desired and many crude oils resist these old methods.

I found that by adding water and a suitable gas under pressure and then reducing the pressure that the expansion of the gas and the presence of the water will cause a removal of the salt from the oil along with a substantial part of any water present in the oil. I also find that the addition of heat at suitable points and the use of a suitable alkali aid in this new process.

One object of the present invention is to provide an efficient method for the removal of salt from oil.

Another object is to provide a suitable method for the removal of water from oil.

Another object is to provide a method for removing salt and/or water from oil in which water and gas are added under pressure to the oil and then the pressure is reduced.

Another object is to provide a method in which water, alkali, gas, and heat are added to the oil and the oil is placed under pressure and then the pressure is released with a resulting reduction of salt and water content of the oil, and neutralization of any acids therein.

A further object is to treat crude oil as set forth in the specification and claims.

Numerous other objects and advantages will be apparent to those skilled in the art upon reading the accompanying specification and claims and looking at the drawing.

The single figure shown in the drawing is a conventionalized flow diagram showing the practice of an embodiment of the method that constitutes the present invention.

As shown in the drawing, crude oil containing salt enters the system through pipe 1 and preferably is raised in pressure by means of pump 2. The crude oil then flows through pipe 3 and through heat exchanger 4. The oil preferably is heated in the heat exchanger 4 and then passes through pipe 5 to a mixer 6 which preferably is the usual centrifugal pump mixer.

Before passing into mixer 6 a suitable gas or vapor is added to the crude oil through line 7. Water is added through line 8 and preferably this water contains a suitable alkali material such as caustic soda, soda ash, potash, sodium bicarbonate, ammonium hydrate, borax, sodium phosphate, aniline and pyridine.

The centrifugal pump 6 mixes the oil and added materials together in a fairly fine mixture. In some instances it is necessary when using certain crude oils to avoid too fine mixing as such excessively intimate mixing may result in forming an emulsion which is hard to break. It is easy to determine the degree of mixing that may take place with the oil to be treated and the usual centrifugal pump mixer will not mix the usual oil too intimately with the other materials.

The mixture flows from pump 6 through pipe 9 to heat exchanger 10 where it is preferably heated to a higher temperature. Centrifugal pump 6 has increased the pressure over the pressure created by pump 2. It is possible to vary the treatment slightly for certain crude oil by varying the amount of pressure rise at pump 2 and at pump 6 and in some cases it is not necessary to have any substantial rise at one or the other pumps but instead throw most of the load on either pump 2 or pump 6. However, the load may be equally divided.

The mixture flows from a line 9 through heat exchanger 10 and line 11 to separating tank 12. The separating tank may be a region of reduced pressure or of increased temperature. Either of these physical characteristics will cause evolution of gas from the mixture coming through pipe 11. However, it is preferable to have both a region of reduced pressure and increased temperature and heating coils 13 or other heating means may be provided to increase the temperature in separator 12.

While there are three possibilities, namely that the mixture be ejected into the gas phase 14, the oil phase 15 or the water phase 16, all with advantageous results, I find it preferable to eject the mixture into the water phase 16 and while the ejection may be through a single pipe 11, I prefer to eject through a plurality of spaced spray nozzles 17 of the usual type.

While the reduction of pressure over a long period of time will cause the evolution of gas, I prefer to suddenly eject the mixture from spray nozzles 17 so that a relatively sudden reduction in pressure occurs. In the embodiment shown in the drawing and employing such an oil as an Oklahoma City crude oil containing salt and a small amount of water in oil emulsion, the following theory may be given for the operation of method. The preliminary heating in 4 decreases the viscosity of the oil and the water in the solution added through 6 will dissolve the salt upon contact and will not dissolve substantially any of the crude oil. The propane added through line 7 will dissolve preferably in the oil. The centrifugal pump 6 will generally invert the emulsion that was in the oil so that the mixture in pipe 9 is now an easily breakable oil in water emulsion. An easy method of increasing the vapor pressure of the gas without further addition of gas is to heat the mixture and this may be done in either heat exchanger 10 or by means of coil 13, but preferably by both.

However, some results may be obtained without any of the heating means 4, 10 or 13, but preferably at least one of these heating means is desirable and, as shown, preferably all three are employed.

In tank 12 the mixture coming out of nozzles 17, preferably into water phase 16, is preferably rapidly decreased in pressure. The sprayed mixture is in the form of small particles of oil which have a large surface in contact with the water bath 16. The gas or vapor which was added through pipe 7 expands due to the reduced pressure and/or increased temperature and ruptures the surface film of the oil particle allowing the occluded water and salt to settle out of the mixture.

The separation of the gas 14, oil 15, and water 16 is an obvious well-known process and obviously water may be drawn off through pipe 18. Obviously the oil drawn off through pipe 19 may contain some of the gas which may be removed if desired by suitable fractionating apparatus (not shown).

Similarly the gas or vapors in line 20 may carry with them some of the oil which also may be recovered by suitable fractionating apparatus (not shown).

The amount of water that is added may vary between wide limits but it is preferable to add an excess amount of water rather than too little. On the other hand there is an upper limit in the amount of water because of expense in handling. While the amount of water may vary considerably, a certain amount may be found preferable with certain oils and with an oil of the Oklahoma City type, mentioned above, equal parts of water and oil may be employed. The amount of alkali depends upon the character of the oil, and as the alkali is an item of considerable expense, it is desirable to keep the amount added down. With usual oils one pound of alkali to 16,000 pounds of oil is often sufficient although some oils may require considerably more alkali and some may allow the employment of much less.

The alkali is proportioned to neutralize any acids present and the water acts to dissolve the salts.

In the application of the propane to the usual type of oil, improved results may be noted over a wide range extending from very little propane to large amounts thereof. It is believed the beneficial results are more noticeable when the propane is in the range of from 5 pounds to 100 pounds of propane per 300 pounds of oil. With an oil of the Oklahoma City type it may be most economical to use 32 pounds of propane per 300 pounds of oil.

A suitable gas for practicing the present method should be soluble in oil and not react with the oil, water, or alkali employed and should evolve readily under the conditions in separator 12. While many gases may be employed, the following gases are preferable. Hydrocarbon gases, carbon dioxide, hydrogen, nitrogen, ammonia, and mixtures of these gases. Such a mixture as nitrogen and carbon dioxide is suitable.

Such reactive gases as oxygen are considered undesirable because oxygen may oxidize the oil and while air is not as reactive, it still contains enough oxygen to often be inferior to the gases preferred, although air or oxygen can be used in some instances.

When using hydrocarbon gases, it is obvious that methane, ethane, propane, and butane in the order named, will be easier to dissolve and harder to evolve again as gases. However, these are all more suitable than such liquids as pentane, hexane, and heptane.

While the present invention has been described as a method of desalting and/or dewatering oil there are obviously other impurities, such as substantially unbreakable emulsions, which may be removed by the present method, and when the present method is practiced on oil containing any such type impurity, the oil will be improved and it is intended that the claims be commensurate with the invention and cover such treatments. Also desalting should be regarded as inclusive of the removal of any material soluble in the aqueous phase employed from the oil, and dewatering as inclusive of breaking of emulsions to thereby dewater.

The illustrative embodiment shown in the drawing and described above is recorded to illustrate the advantages of my invention. Obviously many other embodiments differing in minor details but within the scope of my invention may be made without departing from the invention, which is defined in the following claims:

Having described my invention, I claim:

1. The method of desalting and/or dewatering an oil comprising the steps of placing the oil under pressure, adding water, alkali and gas, mixing the oil, water, alkali and gas together, heating the mixture, ejecting the mixture under water into a region of sufficiently reduced pressure to permit formation of gas bubbles, and separating the oil from the water, alkali and gas.

2. The method of desalting and/or dewatering an oil comprising the steps of placing the oil under pressure, adding water and gas, mixing the oil, water and gas together, heating the mixture, ejecting the mixture under water into a region of sufficiently reduced pressure to permit formation of gas bubbles, and separating the oil from the water and gas.

3. The method of desalting and/or dewatering an oil comprising the steps of placing the oil under pressure, adding water and gas, mixing the oil, water and gas together, heating the mixture, ejecting the mixture into a region of sufficiently reduced pressure to permit formation of gas bubbles, and separating the oil from the water and gas.

4. The method of desalting and/or dewatering an oil comprising the steps of placing the oil under pressure, adding water, alkali and gas, mixing the oil, water, alkali and gas together, ejecting the mixture under water into a region of sufficiently reduced pressure to permit formation of gas bubbles, and separating the oil from the water, alkali and gas.

5. The method of desalting and/or dewatering an oil comprising the steps of placing the oil under pressure, adding water, alkali and gas, mixing the oil, water, alkali and gas together, ejecting the mixture into a region of sufficiently reduced pressure to permit formation of gas bubbles, and separating the oil from the water, alkali and gas.

6. The method of desalting and/or dewatering an oil comprising the steps of placing the oil under pressure, adding water and gas, mixing the oil, water and gas together, ejecting the mixture under water into a region of sufficiently reduced pressure to permit formation of gas bubbles, and separating the oil from the water and gas.

7. The method of desalting and/or dewatering an oil comprising the steps of placing the oil under pressure, adding water and gas, mixing the oil, water and gas together, ejecting the mixture into a region of sufficiently reduced pressure to permit formation of gas bubbles, and separating the oil from the water and gas.

8. The method of desalting and/or dewatering an oil comprising the steps of placing the oil under pressure, heating the oil, adding water, alkali and gas, mixing the oil, water, alkali and gas, placing the mixture under pressure, heating the mixture, ejecting the mixture under water into a region of sufficiently reduced pressure and increased temperature as to cause the evolution of gas therefrom, and separating the oil from the water, alkali and gas.

9. The method of desalting and/or dewatering an oil comprising the steps of placing the oil under pressure, adding water, alkali and gas, mixing the oil, water, alkali and gas, ejecting the mixture under water into a region of sufficiently increased temperature as to cause the evolution of gas therefrom, and separating the oil from the water, alkali and gas.

10. The method of desalting and/or dewatering an oil comprising the steps of placing the oil under pressure, adding water and gas, mixing the oil, water and gas, ejecting the mixture under water into a region of sufficiently increased temperature as to cause the evolution of gas therefrom, and separating the oil from the water and gas.

11. The method of desalting and/or dewatering an oil comprising the steps of placing the oil under pressure, adding water and gas, mixing the oil, water and gas, ejecting the mixture into a region of sufficiently increased temperature as to cause the evolution of gas therefrom, and separating the oil from the water and gas.

12. The method of desalting and/or dewatering an oil comprising the steps of placing the oil under pressure, heating the oil, adding water and gas, mixing the oil, water and gas, ejecting the mixture into a region of sufficiently reduced pressure as to cause the evolution of gas therefrom, and separating the oil from the water and gas.

13. The method of desalting and/or dewatering oil comprising the steps of placing the oil under pressure, heating the oil, adding water and gas, mixing the oil, water and gas, placing the mixture under pressure, ejecting the mixture into a region of sufficiently reduced pressure as to cause the evolution of gas therefrom, and separating the oil from the water and gas.

14. The method of desalting and/or dewatering an oil comprising the steps of placing the oil under pressure, heating the oil, adding water and gas, mixing the oil, water and gas, ejecting the mixture under water into a region of sufficiently increased temperature as to cause the evolution of gas therefrom, and separating the oil from the water and gas.

15. The method of desalting and/or dewatering an oil comprising the steps of placing the oil under pressure, heating the oil, adding water and gas, mixing the oil, water and gas, ejecting the mixture into a region of sufficiently increased temperature as to cause the evolution of gas therefrom, and separating the oil from the water and gas.

16. The method of desalting and/or dewatering an oil comprising the steps of placing the oil under pressure, heating the oil, adding water, alkali and gas, mixing the oil, water, alkali and gas, ejecting the mixture into a region of sufficiently reduced pressure as to cause the evolution of gas therefrom, and separating the oil from the water, alkali and gas.

17. The method of desalting and/or dewatering an oil comprising the steps of placing the oil under pressure, heating the oil, adding water, alkali and gas, mixing the oil, water, alkali and gas, ejecting the mixture into a region of sufficiently increased temperature as to cause the evolution of gas therefrom, and separating the oil from the water, alkali and gas.

18. The method of desalting and/or dewatering an oil comprising the steps of placing the oil under pressure, adding water and gas, mixing the oil, water and gas, placing the mixture under pressure, ejecting the mixture into a region of sufficiently reduced pressure as to cause the evolution of gas therefrom, and separating the oil from the water and gas.

19. The method of desalting and/or dewatering an oil comprising the steps of placing the oil under pressure, adding water and gas, mixing the oil, water and gas, heating the mixture, ejecting the mixture into a region of sufficiently increased temperature as to cause the evolution of gas therefrom, and separating the oil from the water and gas.

JESSE A. GUYER.